(12) United States Patent
Certain et al.

(10) Patent No.: US 10,942,910 B1
(45) Date of Patent: Mar. 9, 2021

(54) JOURNAL QUERIES OF A LEDGER-BASED DATABASE

(71) Applicant: Amazon Technologies, Inc., Seattle, WA (US)

(72) Inventors: Tate A. Certain, Seattle, WA (US); Yannis Papakonstantinou, La Jolla, CA (US); Allan Henry Vermeulen, Parksville (CA); Christopher Richard Jacques de Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 16/200,584

(22) Filed: Nov. 26, 2018

(51) Int. Cl.
| G06F 16/23 | (2019.01) |
| G06F 16/21 | (2019.01) |
| G06F 16/248 | (2019.01) |
| G06F 16/18 | (2019.01) |
| G06F 16/22 | (2019.01) |

(52) U.S. Cl.
CPC .......... *G06F 16/23* (2019.01); *G06F 16/1815* (2019.01); *G06F 16/211* (2019.01); *G06F 16/2282* (2019.01); *G06F 16/248* (2019.01)

(58) Field of Classification Search
CPC ...... G06F 16/23; G06F 16/211; G06F 16/228; G06F 16/1815; G06F 16/2282
USPC ........................................................ 707/703
See application file for complete search history.

(56) References Cited

U.S. PATENT DOCUMENTS

| 4,309,569 A | 1/1982 | Merkle |
| 4,897,842 A | 1/1990 | Herz et al. |
| 8,914,404 B1 | 12/2014 | Kim et al. |
| 9,043,355 B1 * | 5/2015 | Kapoor .................... G06F 8/63 707/769 |
| 9,509,652 B2 * | 11/2016 | Ahn ..................... G06Q 10/107 |
| 2002/0010701 A1 | 1/2002 | Kosciuszko et al. |
| 2006/0047713 A1 * | 3/2006 | Gornshtein ............ G06F 16/27 |
| 2010/0049715 A1 | 2/2010 | Jacobsen et al. |
| 2011/0055201 A1 | 3/2011 | Burger |
| 2015/0081623 A1 * | 3/2015 | Promhouse ......... G06F 16/2468 707/607 |

(Continued)

FOREIGN PATENT DOCUMENTS

| EP | 818743 A2 | 1/1998 |
| EP | 1164510 A2 | 12/2001 |
| WO | WO 2015/187187 A1 * | 12/2015 ............. G06F 17/30 |

OTHER PUBLICATIONS

Plattner, Hasso, "A Common Database Approach for OLTP and OLAP Using an In-Memory Column Database", SIGMOD '09, Providence, RI, Jun. 29-Jul. 2, 2009, 7 pages.*

(Continued)

*Primary Examiner* — Robert Stevens

(74) *Attorney, Agent, or Firm* — Davis Wright Tremaine LLP

(57) ABSTRACT

A database management system stores data for a table as a journal of transaction. The records of the journal comprise information indicative of changes applied to a document of the table. The database receives a query on a table of transactions performed on the table. In response to the query on the table of transactions, the database generates results by retrieving and projecting the records of the journal in accordance with the query. The results of the query are indicative of changes applied to the document of the table.

20 Claims, 11 Drawing Sheets

(56) References Cited

U.S. PATENT DOCUMENTS

| | | |
|---|---|---|
| 2017/0250815 A1 | 8/2017 | Cuende et al. |
| 2017/0272250 A1 | 9/2017 | Kaliski, Jr. |
| 2017/0301047 A1 | 10/2017 | Brown et al. |
| 2018/0089041 A1 | 3/2018 | Smith et al. |
| 2019/0004789 A1 | 1/2019 | Mills |
| 2019/0004974 A1 | 1/2019 | Chhabra et al. |
| 2019/0087600 A1 | 3/2019 | Sion et al. |
| 2020/0052884 A1 | 2/2020 | Tong et al. |
| 2020/0169412 A1 | 5/2020 | Certain et al. |

OTHER PUBLICATIONS

Haber et al., "How to Time-Stamp a Digital Document," The Journal of Cryptology 3(2):99-111, Jan. 1991, 13 Pages.

Oberhaus, "Radioactive Material From Chernobyl Will Help Secure the Next Version of Zcash: How to use toxic waste to generate 'toxic waste,'" Feb. 14, 2018, retrieved Nov. 8, 2019 from https://www.vice.com/en_us/article/gy8yn7/power-tau-zcash-radioactive-toxic-waste, 5 pages.

Oberhaus, "The World's Oldest Blockchain Has Been Hiding in the New York Times Since 1995: This really gives a new meaning to the 'paper of record,'" Apr. 27, 2018, retrieved Nov. 7, 2019 from https://www.vice.com/en_us/article/j5nzx4/what-was-the-first-blockchain, 5 pages.

Oberhaus, "Watch This Hilarious Bitcoin Explainer Generated by an AI: Botnik strikes again with a short Bitcoin explainer made by a predictive text AI that was trained on other Bitcoin explainers," May 23, 2018, retrieved Nov. 7 from https://www.vice.com/en_us/article/xwmy9a/watch-botnik-ai-bitcoin-explainer, 9 pages.

OKrent, "The Public Editor; Paper of Record? No Way, No Reason, No Thanks," Apr. 25, 2004, retrieved Nov. 8, 2019 from https://www.nytimes.com/2004/04/25/weekinreview/the-public-editor-paper-of-record-no-way-no-reason-no-thanks.html, 4 pages.

Whitaker, "The Eureka Moment That Made Bitcoin Possible: A key insight for the technology came to a physicist almost three decades ago at a Friendly's restaurant in New Jersey," May 25, 2018, retrieved Nov. 8, 2019 from https://www/wsj.com/articles/the-eureka-moment-that-made-bitcoin-possible-1527268025, 4 pages.

International Search Report and Written Opinion dated Feb. 26, 2020, in International Patent Application No. PCT/US2019/063103, filed Nov. 25, 2019, 15 pages.

International Search Report and Written Opinion, dated Feb. 21, 2020, in International Patent Application No. PCT/US2019/063058, filed Nov. 25, 2019, 17 pages.

Wikipedia, "Merkle tree," Oct. 30, 2018, retrieved Feb. 11, 2020, from https://en.wikipedia.org/w/index.php?title=Merkle tree&oldid=866395282, 5 pages.

\* cited by examiner

JOURNAL QUERIES OF A LEDGER-BASED DATABASE

BACKGROUND

Database management systems provide facilities to store and retrieve data. Although a wide variety of database management systems exists, the most popular may be divided into one of two categories. The first category of databases, relational databases, are those built on the relational model and generally supporting tables of fixed-length records. The second category is non-relational databases, which may substitute the comparatively rigid structured query language ("SQL") with other query mechanisms. Databases of both of these categories are widely used. However, database management systems in both categories have their own respective limitations.

BRIEF DESCRIPTION OF THE DRAWINGS

Various techniques will be described with reference to the drawings, in which.

DETAILED DESCRIPTION

Figure 1:
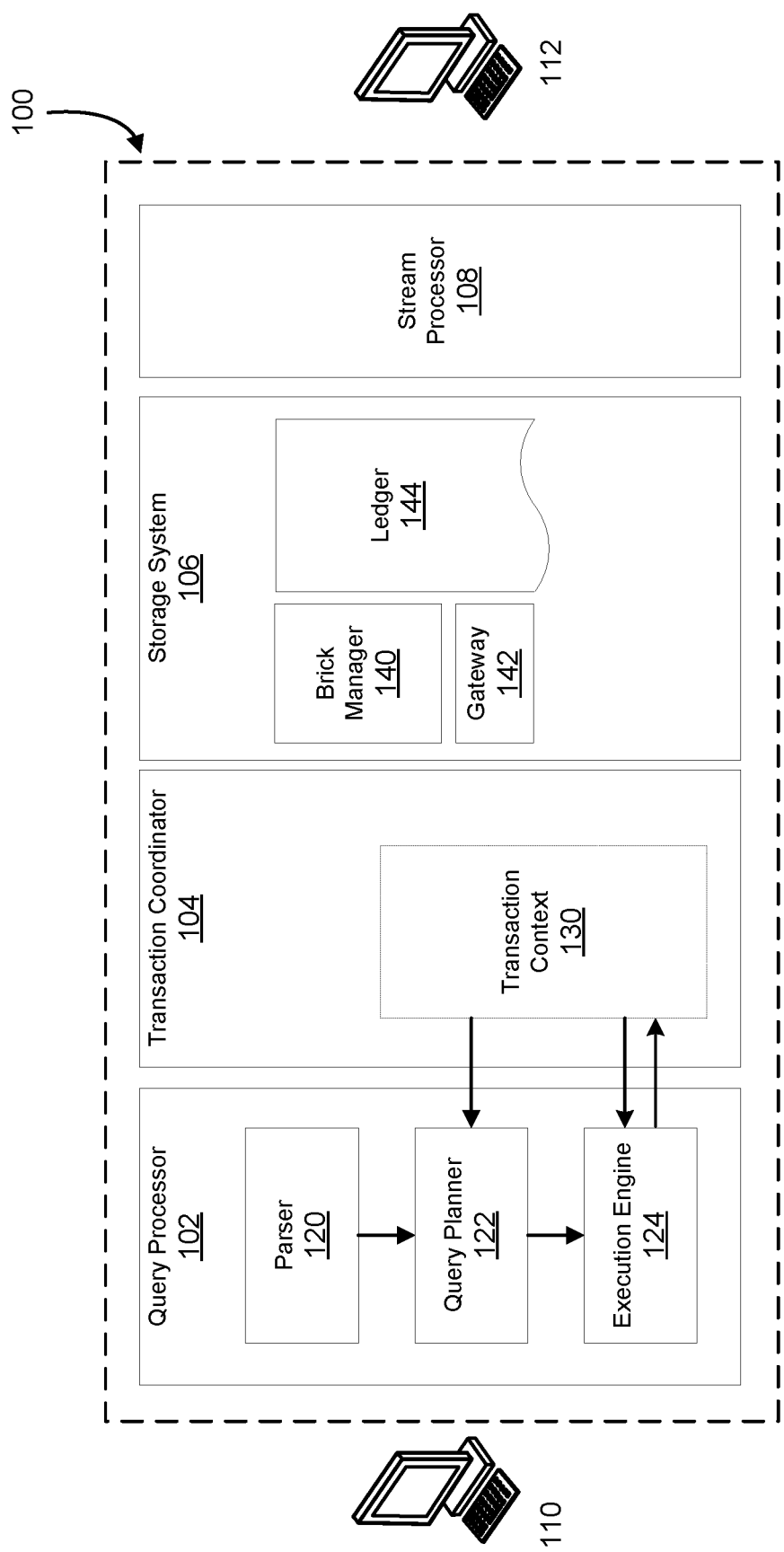
FIG. 1 illustrates a ledger-based database system, in accordance with an embodiment.

Described herein are systems and techniques related to the operation of a ledger-based database management system. A ledger, as used herein, comprises journal and summary data structures adapted for use in a database management system. A journal records an immutable history of transactions performed on a document managed by the system, and a summary provides a synopsis of the document's current state.

In an example embodiment, a ledger-based database management system provides access to the history of transactions stored in the ledger. The example system receives various queries and command from a client of the system, such as query language commands to insert, update, and delete documents stored in tables managed by the system. The example system can also respond to queries of the tables—these are processed based at least in part on access to summary components of the ledger. However, in order to provide access to the history of transactions, the system supports queries directed to the journal components of the ledger. These queries, which may be described as journal queries, are written against a journal table schema which is derived by the system from the schema of the corresponding document table. The system generates results for a journal query by scanning and retrieving data from the journals, and projecting the retrieved data in accordance with the schema of the journal table and the query.

In another example, a method of operating a ledger-based database management system includes storing data for a document table as a journal of transactions. The journal of transactions includes records which describe changes applied to one or more documents of the document table. The method further includes receiving a query on a journal table, which may be described as a table of transactions performed on the document table. In response to the query, the method includes generating results by at least retrieving and projecting the journal records in accordance with a journal table schema and the query, such that the results of the query are indicative of the changes applied to the at least one document of the first table.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. Embodiments are capable of providing accessing journal data using a mechanism that corresponds to and is as convenient as the mechanism used to access document tables. Embodiments are capable of providing a complete history of changes made to a document stored in a table. Embodiments are also capable of providing a complete history of changes made to a document, even if that document was deleted from the database.

FIG. 1 illustrates a ledger-based database system, in accordance with an embodiment. The example ledger-based database system 100 comprises a query processor 102, transaction coordinator 104, storage system 106, and stream processor 108.

A client device 110 may send queries to the database system 100. Here, a query refers to a request for information to be retrieved by the database system 100, expressed in accordance with a query language definition and a schema. For example, a query might be expressed in structured query language ("SQL"), or a variant thereof, and might further conform to the schema of a table referenced by the query. Schema refers to the names and structure of a table or other element, such as a view or index. A query that conforms to a schema refers to names and structures consistent with the schema. For example, the projection clause of a query may generally refer only to columns of a table that exist in the corresponding schema, except for special circumstances such as projection columns that are defined by the query itself.

A client device 112 may also access stream functions of the distributed database system 100. Alternatively, various hosted services may access stream functions. Here, stream functions refers to features of the distributed database that relate to direct and/or immediate access to a stream of transactions processed by, about to be processed by, or being processed by, the database system 100.

In an embodiment, a query processor 102 comprises a module operative on a computing device comprising at least one processor and a memory. As used herein, a module or sub-module refers to a portion of the memory in which processor-executable instructions are stored, where the instructions, when executed by the processor, cause the computing device to perform the functions attributed to the module. The query processor 102 performs functions related to processing queries received from the client device 110. The query processor 102 may comprise a parser 120, query planner 122, and execution engine 124. The database system 100 may comprise a fleet of query processors similar to the query processor 102 depicted in FIG. 1, to facilitate scaling.

In an embodiment, the parser 120 performs lexical and semantic analysis of a received query. This may include converting textual components of the received query to non-textual data structures, such as abstract syntax trees. It may further involve determining whether the query is syntactically valid, and valid with respect to any relevant schemas.

In an embodiment, the query planner 122 determines a plan for executing the received query. This may involve identifying various approaches to executing the query, estimating the costs of the various approaches, and selecting a plan believed by the query planner 122 to be most optimal. The query planner 122 may rely on various statistics, some of which may be provided by the storage system 106, regarding the amounts of relevant data stored by the storage system 106, how long it might take to scan or retrieve the relevant data, and so forth.

In an embodiment, the execution engine 124 obtains a plan for executing the query from the query planner 122, and executes the plan. Executing the plan may generally involve initiating scanning and retrieval of data, and assembling the results of the query. The execution engine, for example, may process a query by initiating a scan of a summary table or journal, or initiating some other operation, in order to retrieve data relevant to the query. The scanning and retrieval is performed by the storage system 106. The execution engine, in cases and embodiments, assembles the results of the query by performing join operations, filtering operations, and so on. The execution engine also applies a projection, as reflected in the original query and in the query plan. This step ensures that the assembled results conform to the expected schema.

In an embodiment, a transaction coordinator 104 comprises a module operative on a computing device comprising at least one processor and a memory. The transaction coordinator 104 can be co-located on a computing device with other modules, such as the query processor 102, or it may be located on a separate computing device. The database system 100 may comprise a fleet of transaction coordinators similar to the transaction coordinator 104 depicted in FIG. 1, to facilitate scaling.

The transaction coordinator manages query execution and command execution, to implement transactional properties such as atomicity, consistency, isolation, and durability. These are sometimes referred to as "ACID" properties. The transaction coordinator 104 communicates with the query processor 102 and storage system 106 to ensure that queries and command intended to be performed in a transaction context 130, are executed according to desired levels of ACID conformance.

In an embodiment, a storage system 106 comprises a module operative on a computing device comprising at least one processor and a memory. The storage system 106 can be co-located on a computing device with other modules, or located on a separate computing device. The database system 100 may comprise a fleet of storage systems similar to the storage system 106 depicted in FIG. 1, to facilitate scaling. The storage system 106 may comprise various sub-modules, including a brick manager 140, gateway 142, and ledger 144. Further aspects of these components of the storage system 106 are described herein. In general, the storage system 106 is responsible for performing storage and retrieval operations on the ledger 144.

In an embodiment, a stream processor 108 comprises a module operative on a computing device comprising at least one processor and a memory. The stream processor 108 can be co-located on a computing device with other modules, or located on a separate computing device. The database system 100 may comprise a fleet of stream processors similar to the stream processor 108 depicted in FIG. 1, to facilitate scaling. The stream processor 108 provides direct or immediate access to a stream of transactions processed by, about to be processed by, or being processed by, the database system 100. Various client devices and hosted client applications, such as the depicted client device 112, may access the stream of transactions and respond to the transactions as they occur.

Figure 2:
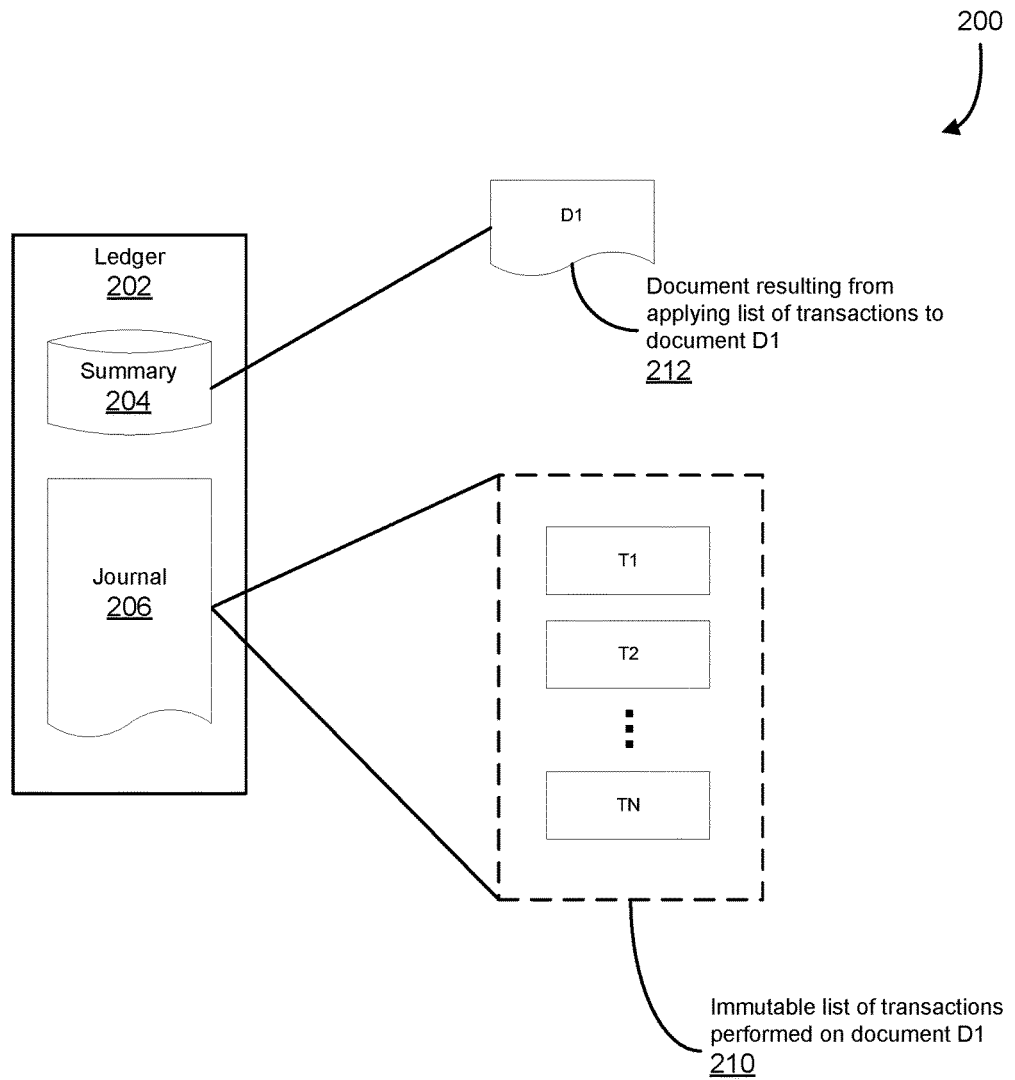
FIG. 2 illustrates distributed storage of a ledger used in conjunction with a ledger-based database system, in accordance with an embodiment.

The database system 100 of FIG. 1 is described as being ledger-based because it uses a ledger as its underlying storage structure. FIG. 2 illustrates distributed storage of a ledger used in conjunction with a ledger-based database system, in accordance with an embodiment. The ledger 202 of FIG. 2 may therefore correspond to the ledger 144 that FIG. 1 depicts.

The principal components of a ledger are one or more journals of immutable transactions, and a summary that reflects the results of those transactions. As depicted in the example 200 of FIG. 2, a ledger 202 comprises a journal 206 and a summary 204. The ledger 202 of FIG. 2 corresponds to the ledger 144 of FIG. 1.

The ledger 202 comprises a list of immutable transactions applied to documents or other data maintained by the distributed database 100. For example, the ledger 202 might comprises a list 210 of transactions performed on a document D1. The transactions are considered immutable because, once entered into the journal 206, they are neither changed nor deleted. The journal 206, in various embodiments, thus contains a complete and verifiable history of all changes made to the document D1.

The ledger 202 further comprises a summary 204. The summary 204 reflects the contents or state of each document stored in the database after applying all of the committed transactions, in order. For example, the summary 204 might contain the document 212 resulting from applying the list 210 of transactions applied to the document D1.

In various embodiments, the database system 100 supports queries of tables and views, and the use of indexes, in a manner that at least appears to the user to be similar to that of traditional relational database management systems. The database system 100, in various embodiments, provides a session-based transactional application programming interface ("API"). Through the interface, using a superset of SQL, client devices may interact with documents, tables, views, and indexes, despite the difference in the underlying storage structures.

Figure 3:
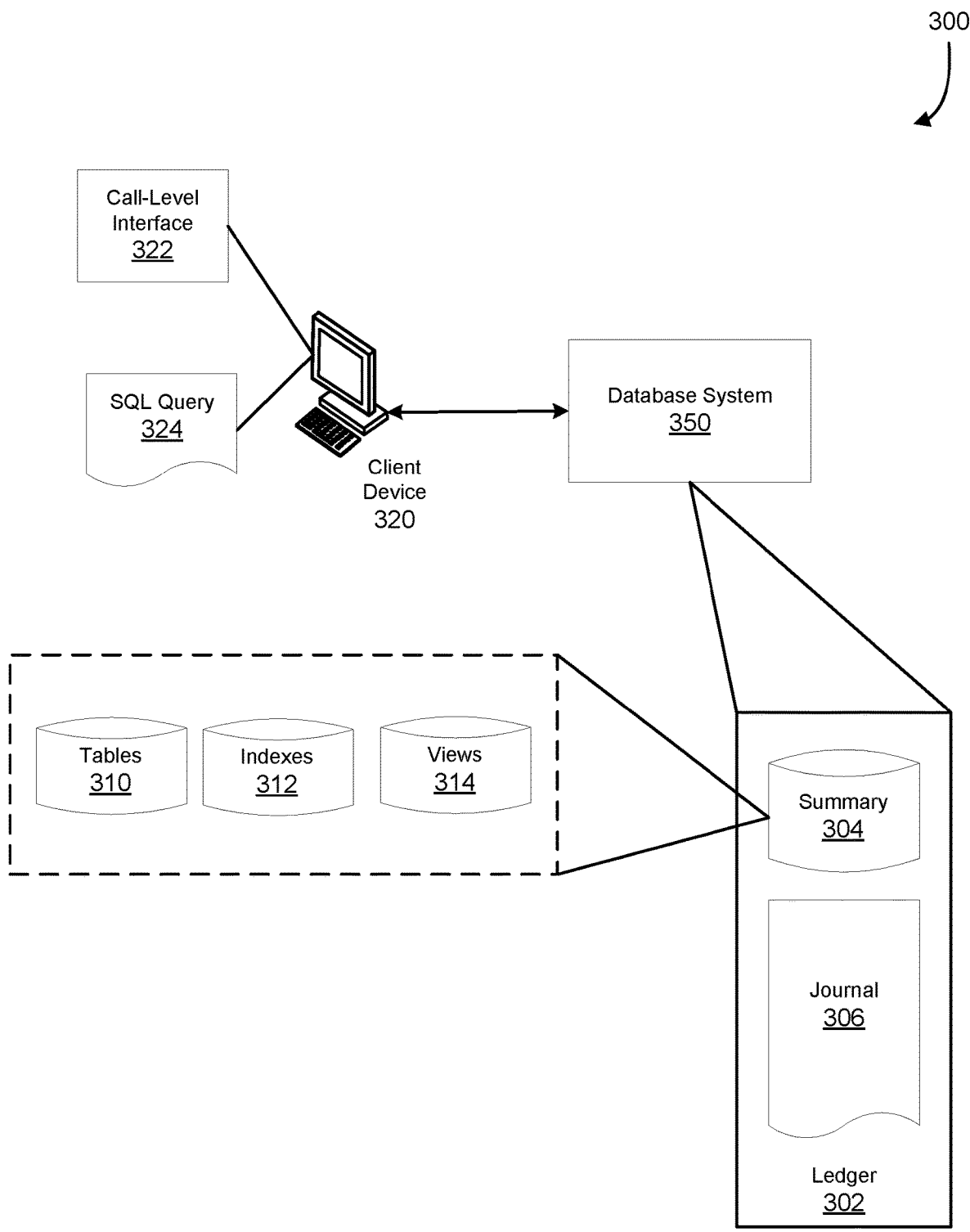
FIG. 3 illustrates aspects of query processing in a ledger-based database system, in accordance with an embodiment.

FIG. 3 illustrates aspects of query processing in a ledger-based database system, in accordance with an embodiment.

In the example 300 of FIG. 3, the ledger 302, summary 304, and journal 306 may correspond to the ledger, summary, and journal depicted in FIG. 2.

In various embodiment, a client device 320, or more generally a client process, sends a SQL query 324 to a database system 350, using a call-level interface 322. The database system 350 depicted in FIG. 3 may correspond to the database system 100 depicted in FIG. 1. The call-level interface 322 can be an API for interacting with a database system, such as various available connectivity interfaces. The SQL queries 324 can be queries expressed in SQL, or a superset or subset thereof. Note, however, that the use of SQL in this example should not be construed so as to limit the scope of the present disclosure to embodiments which use SQL. Embodiments may use any of a wide variety of query languages.

The summary 304 stores data that represents the current state of the ledger's tables 310, indexes 312, and views 314. Aspects of storage techniques for the summary data are described below, regarding FIG. 7.

A query, such as the SQL query 324, can be processed in view of the data contained in the summary 304. For example, a query execution plan might rely on current data stored in the summary, such as index data, to efficiently execute a query. The query execution plan might further rely on current values for elements of a document when applying a projection.

Figure 4:
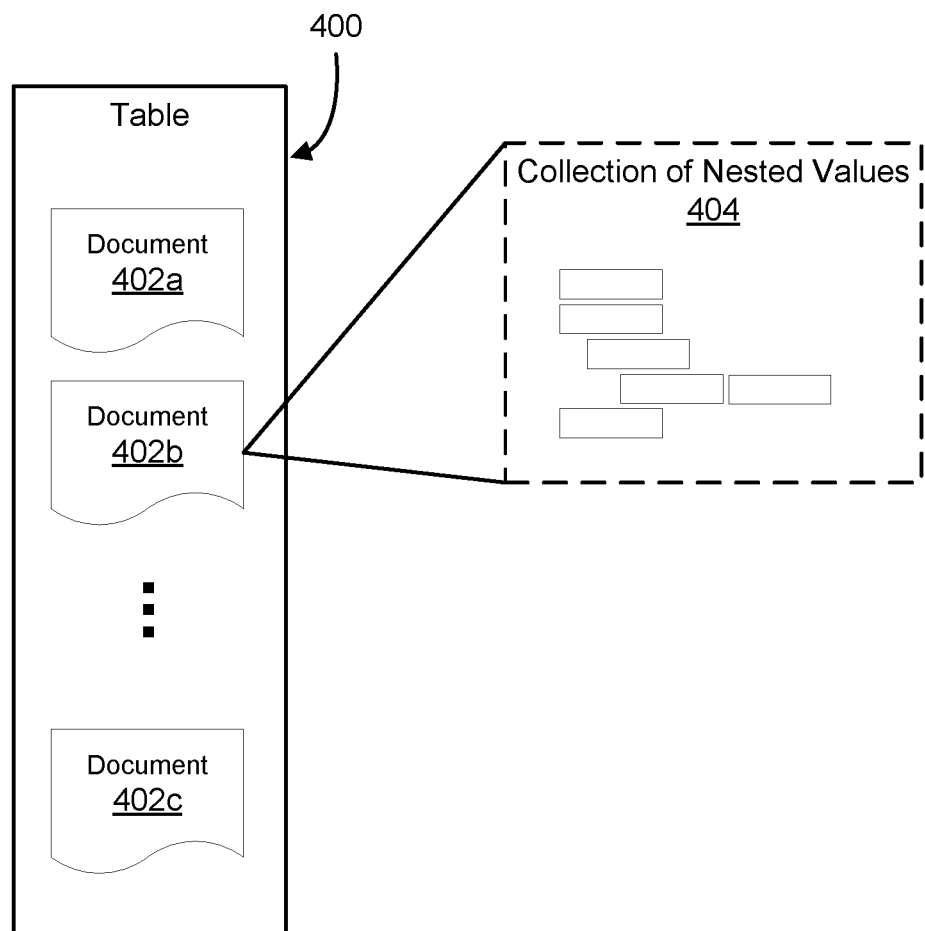
FIG. 4 illustrates a table structure of a ledger-based database system, in accordance with an embodiment.

The tables of the database system 100 are logically organized as collections of documents. FIG. 4 illustrates a table of a ledger-based database system, in accordance with an embodiment. As depicted by FIG. 4, a table 400 comprises a collection of documents 402a-c. A document 402 might also be described as a row of the table. However, in various embodiments, each document can comprise a collection of nested values 404. Accordingly, embodiments may support more loosely structured data than what is typically supported by conventional database management systems.

The example table 400 may generally be treated as a logical entity exposed to a client device via a query language, rather than a physical data storage structure. As described herein, the data for the table 400 is stored using a ledger comprising journal and summary portions.

Figure 5:
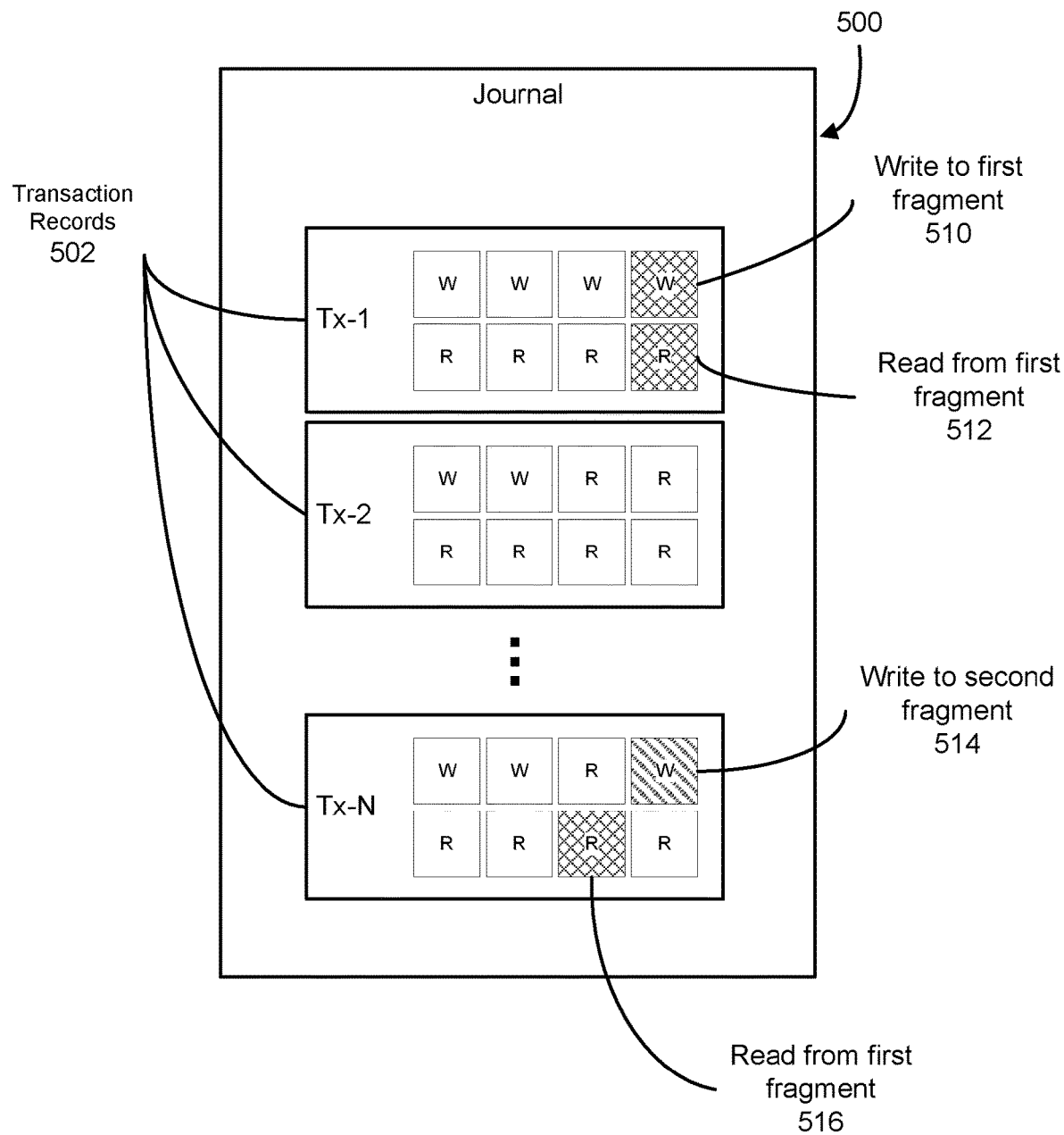
FIG. 5 illustrates a journal, in accordance with an embodiment.

FIG. 5 illustrates a journal, in accordance with an embodiment. In the example of FIG. 5, a journal 500 comprises an immutable, append-only list of transaction records 502. Each of the transaction records 502 comprises data indicative of a read or write operation to a document. There is at least one such chain, or sequence, of transactions for every document represented in the journal 500.

In an embodiment, such as the embodiment depicted in FIG. 5, the transaction records comprise data indicative of a data fragment associated with the read or write operation. For example, in FIG. 5, data is stored indicating that Tx-1 comprises a write to a first fragment 510 and a read from the first fragment 512. Likewise, transaction Tx-N comprises a write to a second fragment 514 and a read from the first fragment 516.

Figure 7:
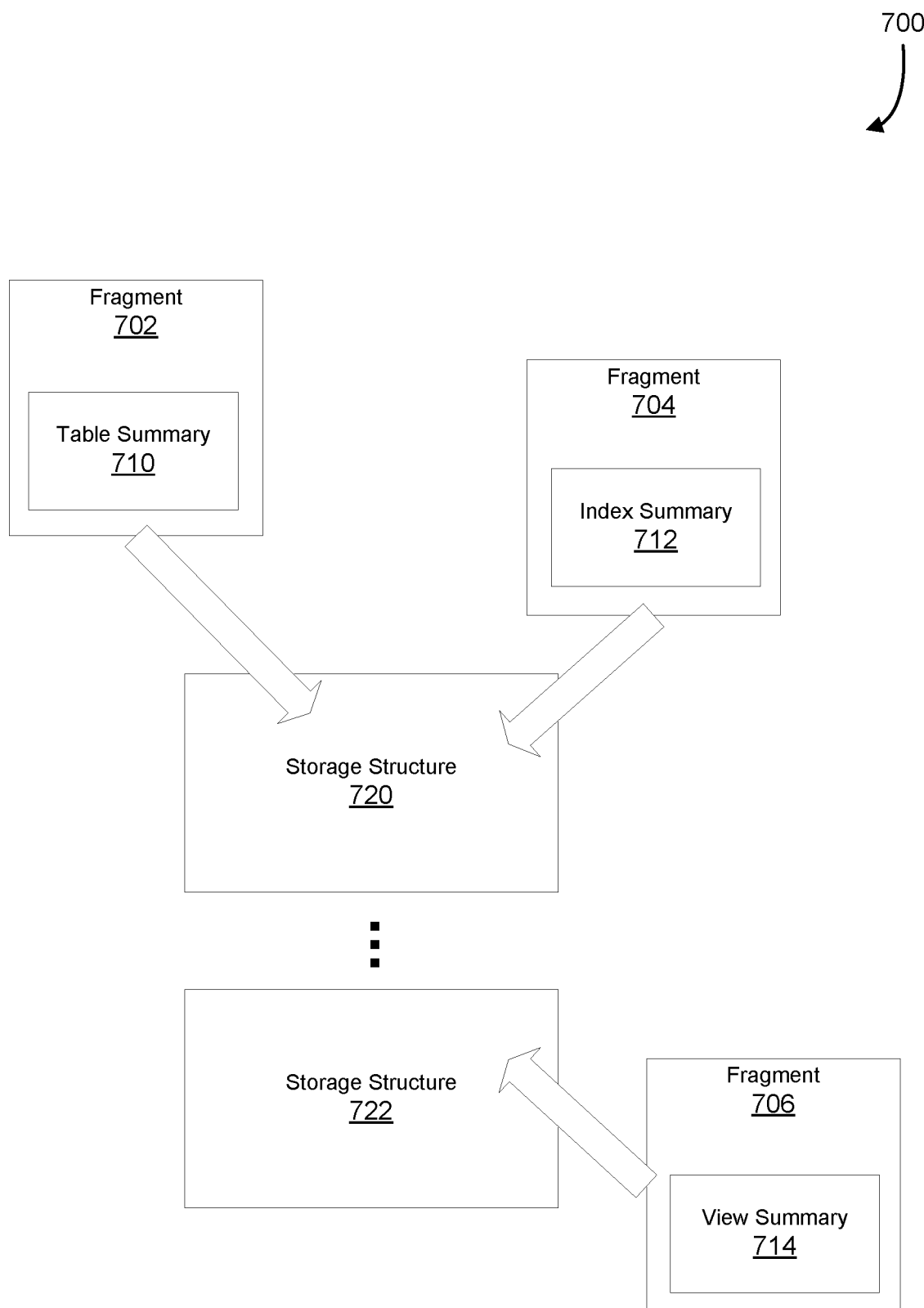
FIG. 7 illustrates aspects of a storage technique for summary data, in accordance with an embodiment.

More generally, the journal 500 comprises transaction records 502 which comprise data indicative of changes made both to a logical document and to the underlying storage structure for the journal. FIG. 7 describes aspects of the storage structure.

As depicted in FIG. 5, entries in the journal 500 are stored to reflect an immutable order, in the same sequence as the transactions were applied. For example, Tx-N represents the oldest transaction, Tx-2 the second most recent transaction, and Tx-1 the most recent. The journal 500 thus provides a complete history of the changes made to each document that is represented in the journal 500.

Figure 6:
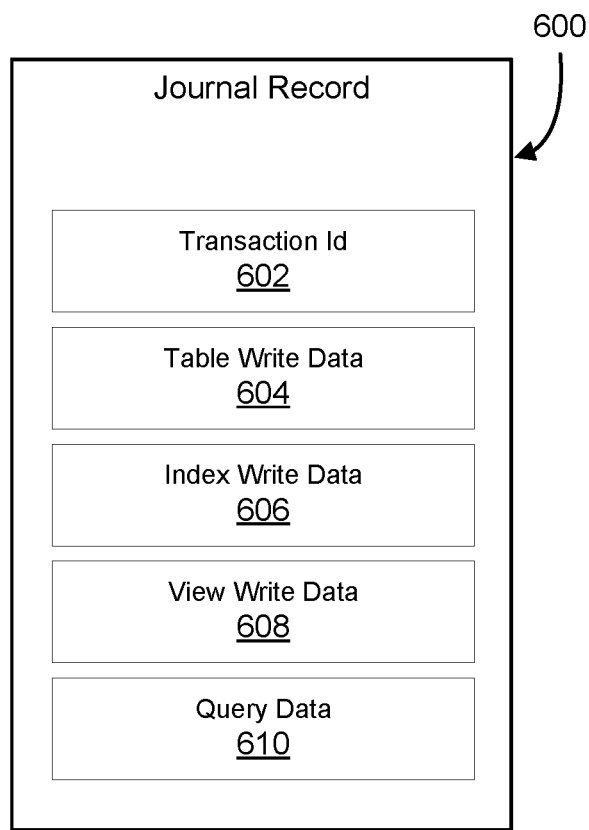
FIG. 6 illustrates aspects of a journal record, in accordance with an embodiment.

FIG. 6 illustrates aspects of a journal record, in accordance with an embodiment. In the example of FIG. 6, a journal record 600 describes various aspects of a transaction. In an embodiment, the journal record might correspond to or be an aspect of one of the transactions Tx-1, Tx-2, ... Tx-N depicted in FIG. 5.

As depicted in FIG. 6, a journal record 600 comprises, in an embodiment, a transaction identifier 602. The transaction identifier 602 may be a sequence number, timestamp, cryptographic hash, and so forth. Note that in some embodiments, cryptographic techniques may be used to safeguard the integrity of the journal record 600 and the journal 500, including safeguards which ensure that the ordering of transactions is preserved. Embodiments may use transaction identifiers 602, or other data included in the journal record, as an aspect of these safeguards.

In an embodiment, the journal record 600 comprises table write data 604. The table write data represents modifications made to a table in the corresponding transaction. For example, the table write data 604 might represent changes made to any documents stored in a table as a result of the transaction.

In an embodiment, the journal record 600 comprises index write data 606. The index write data represents modifications made to an index as a consequence of the corresponding transaction. Likewise, in an embodiment, the journal record 600 comprises view write data 608, which represents modification made to a view as a consequence of the transaction.

In an embodiment, the journal record 600 comprises query data 610, representing a SQL command, query language command, or other command on which the transaction was based. This data may be stored for diagnostic purposes.

As described with reference to FIGS. 5 and 6, a journal record comprises, in various embodiments, references to storage fragments affected by a transaction. FIG. 7 illustrates aspects of a storage technique for summary data which utilizes storage fragments, in accordance with an embodiment.

As depicted in the example 700 of FIG. 7, a number of storage structures 720, 722 store fragments 702-706. Each one of the fragments 702-706 resides on a single one of the storage structures 720, 722. In embodiments, each storage structure resides on a single storage node. A storage node comprises a computing device with at least one processor, a memory, and a storage device such as a flash driver, mechanical disk drive, network attached storage, and so forth.

In various embodiments, a given fragment 702 of a summary is a set of records that are managed by the database system 100 as a unit. The summary is fragmented so that every record in a summary is in exactly one fragment. Each fragment contains only record summaries for any one table, index, or view. For example, a first fragment 702 might comprise data for a table summary 710, a second fragment 704 might comprise an index summary 712, and a third fragment might comprise a view summary 714. In some embodiments, each summary corresponds to exactly one fragment, although in other embodiments a summary may be split across fragments. A fragment is sized so that a large number of records can fit into a single fragment, but is not so large that the time required to do a full scan of the fragment is excessive.

A storage structure, such as any of the depicted storage structures 720, 722, comprises a data structure for storing data. Examples of such structures include, but are not limited to, B-trees, hash buckets, and heap trees. Suitable storage structures provide a scan capability, and may also provide filtering, scan-and-filter, and so forth.

In an embodiment, a given storage structure 720 may store multiple fragments. In other embodiments, a given storage structure 722 stores only a single fragment 706. In some embodiments, a given fragment is replicated to multiple storage structures.

Figure 8:
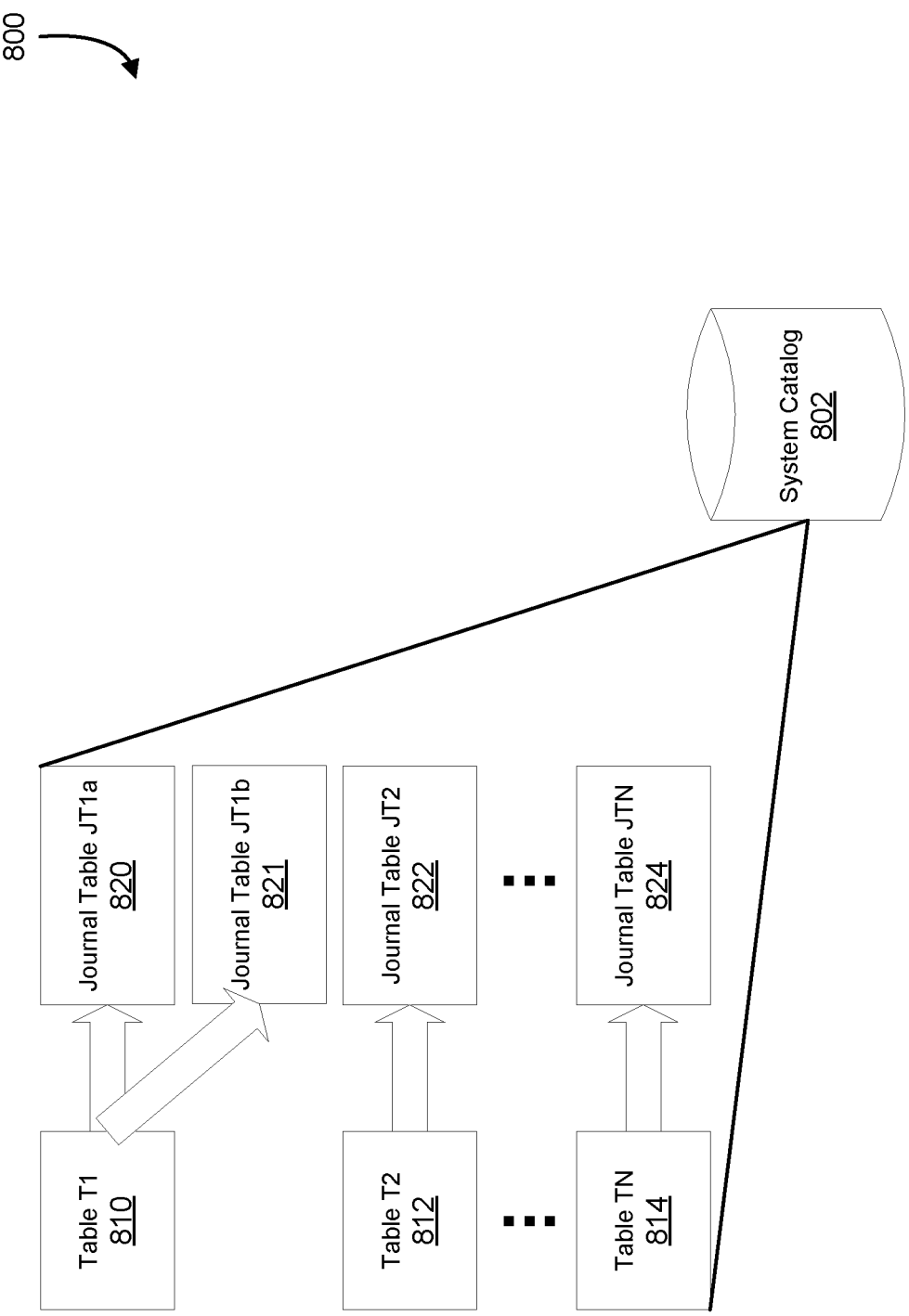
FIG. 8 illustrates aspects of processing queries of journal tables, in accordance with an embodiment.

As described herein, embodiments may provide support for querying the data in a journal. FIG. 8 illustrates aspects of processing queries of journal tables, in accordance with an embodiment.

As depicted by the example 800 of FIG. 8, a system catalog 802 comprises, in an embodiment, a list of tables 810-814 that are defined in the database. Here, a table being defined refers to the table and its schema being known to the database, regardless of whether or not the table is materialized. In various embodiments, a data definition language ("DDL") command is executed to define the table. In embodiments, defining the table comprising storing its definition in the system catalog 802.

In an embodiment, the database system 100 defines a corresponding journal table 820-824 for each corresponding table 810-814. A journal table is a table of documents, and thus the logical structure of the journal tables 820-824 is similar to that of the other tables 810-814. Moreover, the schema of each journal table 820-824 is based on the schema of the corresponding table 810-814. For example, if a table T1 has a column C1, the corresponding journal table JT1 will have one or more columns based on C1. The journal table JT1a might, for example, include a row to represent every change to a document stored in the table T1, and each row might have a column describing a change to the property of the document that corresponds to C1.

The journal tables 820-824 may be constructed according to various schemas, as appropriate for various applications. For example, the journal table JT1a might include columns useful for identifying the history of transactions applied to a particular document, which the journal table JT1b might include columns useful for inspecting the relative order of transactions applied to many objects. More than one journal table 820-821 might be defined for a corresponding table 810. The set of journal tables defined for each table, or for a particular table, may in some embodiments be controlled via configuration settings or by setting the properties of a particular table. Alternatively, or in addition, embodiments may support creating journal tables via data definition language commands, or via a user interface.

Embodiments may also provide support for journal tables which comprise information associated with the underlying data storage structures. For example, embodiments may include support for journal tables which represent transactions recorded on a particular fragment. Likewise, embodiments may support journal tables which represent a set of transactions, the set collectively recorded on a set of fragments.

Figure 9:
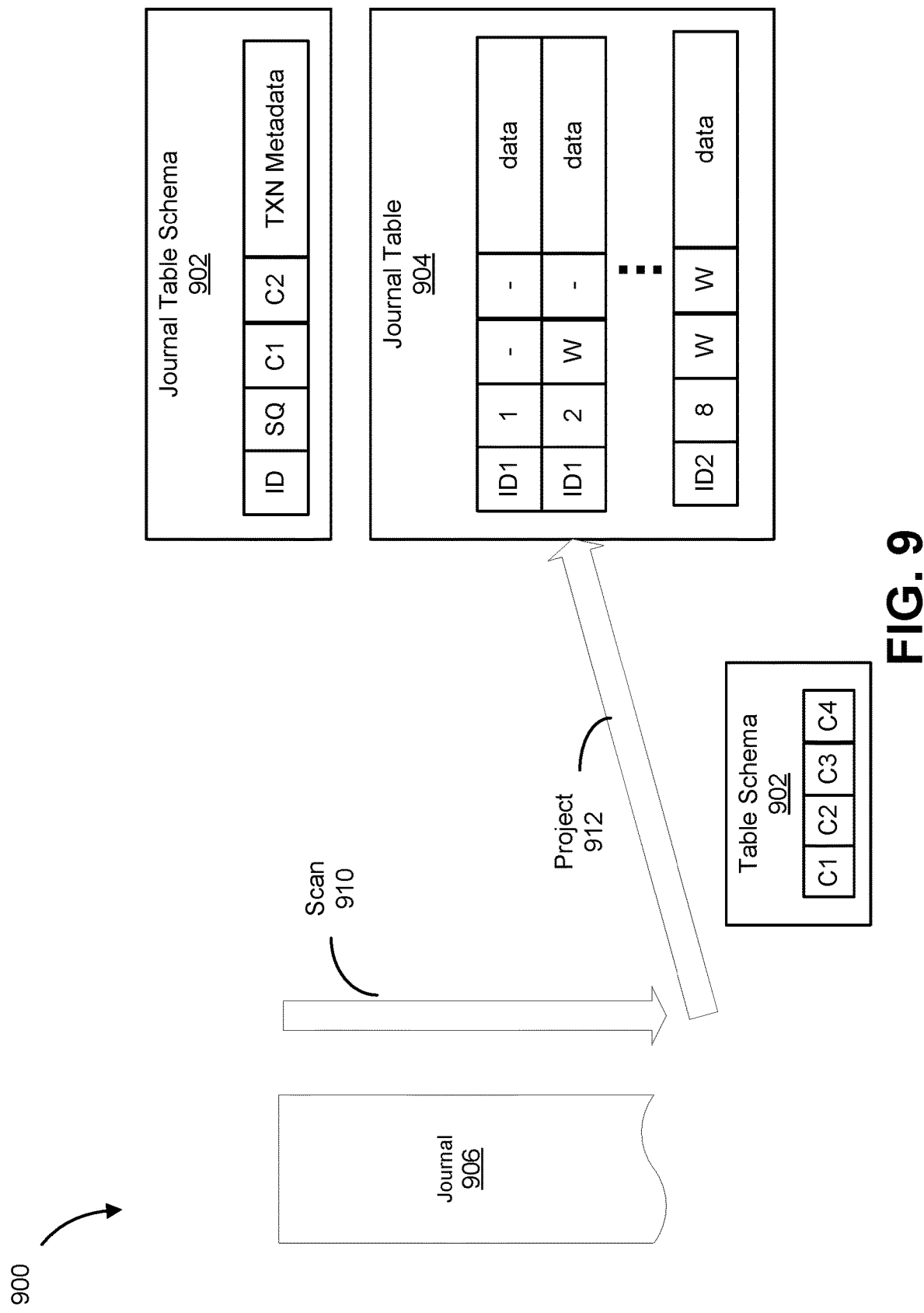
FIG. 9 illustrates further aspects of processing queries of journal tables, in accordance with an embodiment.

FIG. 9 illustrates further aspects processing a journal table query, in accordance with an embodiment. The depicted operations may be performed by a query processor, such as the query processors described herein. As depicted in the example 900 of FIG. 9, a query on a journal table may proceed by performing a scan 910 of a journal 906. The scan 910 may be accompanied by filtering operations. The scan 910 comprises accessing any storage nodes which comprise portions of the journal, locating and filtering relevant records in accordance with the query, and then retrieving the relevant records for further processing. For example, if a query provides instructions to retrieve a history of changes made to a particular document, the scan 910 is performed to locate and retrieve any journal records describing a change made to the document.

The query processor then performs a project 912 operation on the data retrieved from the scan. Projection refers to a mapping operation in which data from the journal records is correlated to elements of the journal table schema 902 and to the instructions provided by the query. For example, if a journal record describes a change to an item "C2" of a document, the projection involves determining whether a column C2 is defined in the table, and whether or not the column C2 is intended to be included in the results of the query.

FIG. 9 also depicts elements of a journal table schema 902 and a corresponding journal table 904. In an embodiment, a journal table schema 902 comprises columns that correspond to those of the corresponding table. For example, for a given column C1 of a table T1, a column C1 is defined in the corresponding journal table schema 902. However, while the column C1 of the table T1 would be represented by the current, or summary, value of the column C1, the value of C1 for a particular row of the journal table 904 would represent a change to that value.

In embodiments, a journal table schema 902 includes additional columns, such as sequence numbers and other transaction metadata. The journal table schema 902 may also, in various embodiments, comprise a document identifier and a sequence number as a compound key, so that an ordered transaction history can be retrieved for any document.

Embodiments may define a wide variety of metadata to be included in the journal table schema 902 and journal table 904. Examples of such metadata include, but are not limited to, the time the transaction was made, a user or account associated with the transaction, data indicative of the computing resources consumed by processing the transaction, the query language command used to initiate the transaction, and so on.

Figure 10:
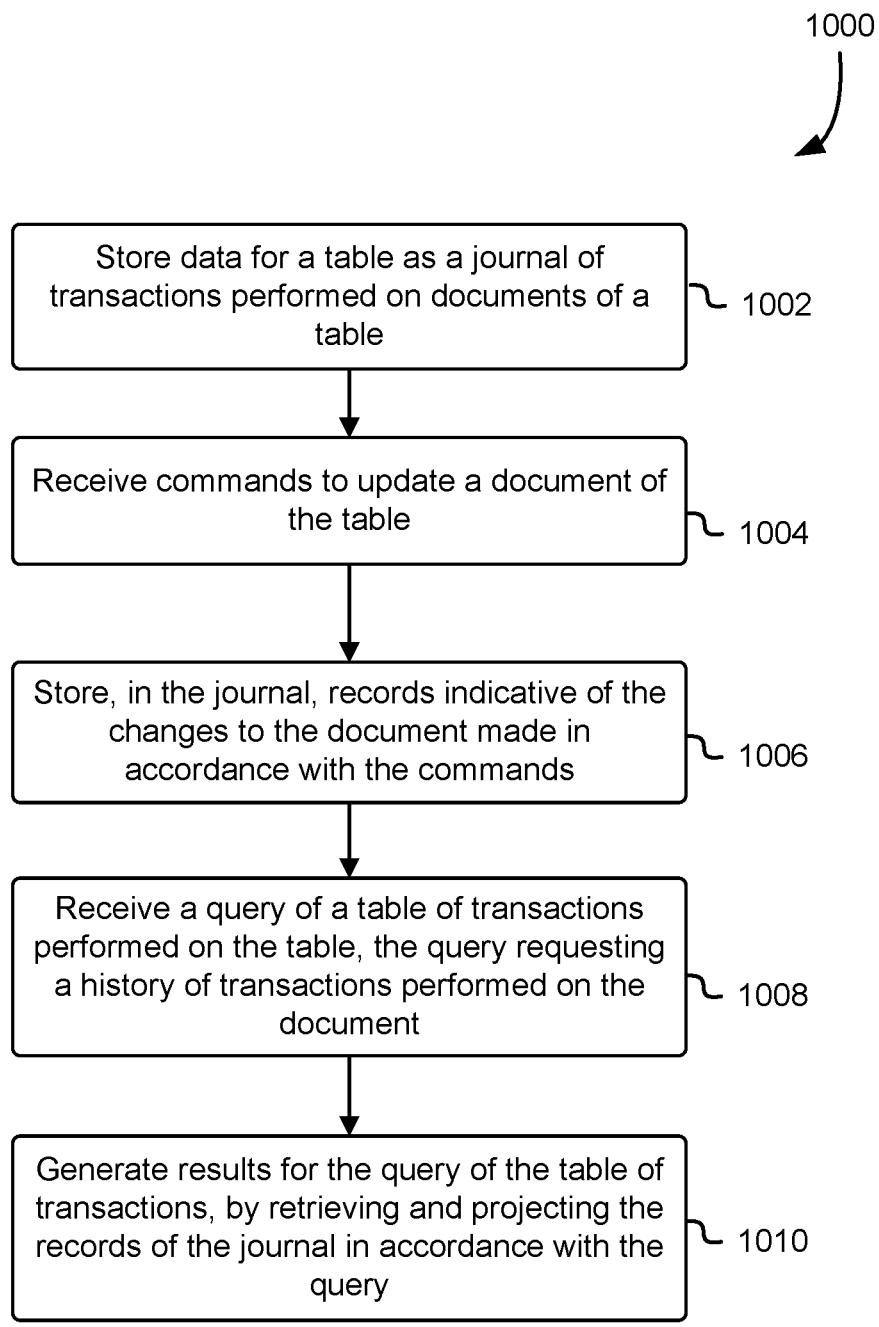
FIG. 10 is a flow diagram depicting a process for operating a database that includes support for journal table queries.

FIG. 10 is a flow diagram depicting a process for operating a database that includes support for journal table queries. Although the example process 1000 depicted in FIG. 10 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The operations depicted by FIG. 10 may be performed by a database system, such as the database system depicted in FIG. 1. In an embodiment, the operations depicted by FIG. 10 are performed, except where noted, by a query processor component of a distributed database, such as the query processor that FIG. 1 depicts.

Step 1002 depicts storing data for a table as a journal of transactions performed on documents of the table. As explained herein, for example with respect to FIGS. 5 and 6, the data storage structure underlying a table, in the various embodiments described herein, is a ledger comprising summary and journal portions. The journal, as described herein, comprises records structured as an immutable, append-only ordered list of transactions performed on the collection of documents represented by the table.

Step 1004 depicts receiving commands to update a document of the table. The commands may be structured as query language commands that result in inserting, updating, or deleting data. It will be appreciated that a command may include instructions to update a number of the documents of a table. However, for simplicity and clarity of description, a single document is referred to.

Step 1006 depicts storing records in the journal, or causing records to be stored in the journal. The records are indicative of the changes made to the document, in accordance with the instructions provided by the received commands. As noted above, the journal is structured as an immutable, append-only list. The query processor determines what changes are indicated by the commands, generates records describing those changes, and appends them to the journal.

Step 1008 depicts receiving a query on a table of transactions performed on the table. The query may, for example, comprise a request to provide a history of transactions performed on the document. The history may be full or partial, sorted by time, filtered by various criteria such as the initiator of the transaction, and so on.

In an embodiment, the table of transactions has a schema that is based at least in part on the first table. As described regarding FIGS. 8 and 9, the table of transactions is exposed by the database system through its system catalog, and through support for queries which reference elements of the schema for the journal table. The schema for the journal table is, as described with reference to FIGS. 8 and 9, derived from the schema of the corresponding table. The query on the table of transactions may, for example, comprise structured query language expressions that reference the schema of the journal table is it is defined in a system catalog.

Step 1010 depicts generating results of the query on the table of transactions, by retrieving and projecting the records of the journal in accordance with the query. Retrieving the plurality of records comprises scanning fragments of the journal stored on a plurality of computing nodes, as described regarding FIG. 9. The projection maps from data of the plurality of records to elements of the schema. As described with respect to FIG. 9, projecting the plurality of records comprises mapping from data of the plurality of records to elements of the schema of the table of transactions.

Figure 11:
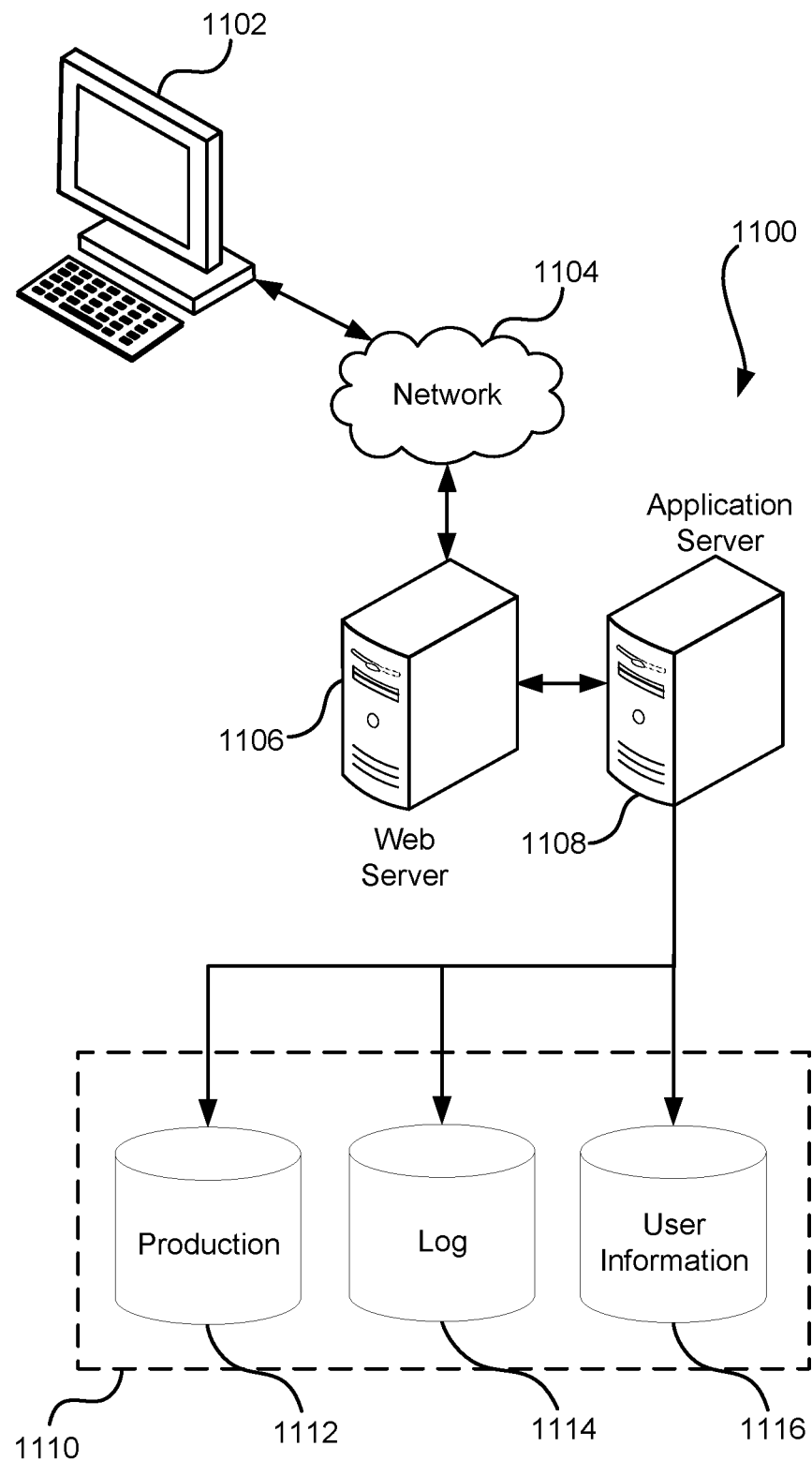
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory that stores computer-executable instructions that, in response to being executed by the at least one processor, cause the system to at least:
      receive a plurality of commands to update at least one document of a first table, wherein data of the first table is stored as a journal of transactions performed on documents of the first table;
      store a plurality of records in the journal of transactions, the plurality of records indicative of changes to the at least one document, the changes made in accordance with the plurality of commands;
      receive a query on a table of transactions performed on the first table, the query indicative of a request for a history of transactions performed on the at least one document; and
      generate results for the query on the table of transactions, based at least in part on retrieval and projection of the plurality of records in accordance with the query.

2. The system of claim 1, wherein the table of transactions has a schema based at least in part on the first table.

3. The system of claim 2, wherein the projection maps from data of the plurality of records to elements of the schema.

4. The system of claim 1, wherein the query on the table of transactions comprises structured query language expressions.

5. The system of claim 1, wherein the results for the query are generated based at least in part on a summary of a journal.

6. A computer-implemented method, comprising:
   storing data for a first table as a journal of transactions, the journal of transactions comprising a plurality of records indicative of changes applied to at least one document of the first table;
   receiving a query on a table of transactions performed on the first table; and
   generating results for the query on the table of transactions, based at least in part on retrieving and projecting the plurality of records in accordance with the query, the results of the query indicative of the changes applied to the at least one document of the first table.

7. The computer-implemented method of claim 6, further comprising parsing the query on the table of transactions based at least in part on a schema of the table of transactions that is based at least in part on schema of the first table.

8. The computer-implemented method of claim 7, wherein projecting the plurality of records comprises mapping from data of the plurality of records to elements of the schema of the table of transactions.

9. The computer-implemented method of claim 6, wherein the query on the table of transactions comprises structured query language expressions.

10. The computer-implemented method of claim 6, wherein the results of the query are indicative of a history of changes to the at least one document.

11. The computer-implemented method of claim 6, further comprising treating the table of transactions as immutable.

12. The computer-implemented method of claim 6, wherein retrieving the plurality of records comprises scanning fragments of the journal stored on a plurality of computing nodes.

13. The computer-implemented method of claim 6, further comprising:
   generating the results for the query on the table of transactions, based at least in part on a summary of the table of transactions.

14. A non-transitory computer-readable storage medium having stored thereon executable instructions that, as a result of being executed by one or more processors of a computer system, cause the computer system to at least:
   process a plurality of commands to update at least one document of a first table, wherein data of the first table is stored as a journal of transactions;
   receive a query on a table of transactions performed on the first table; and
   generate results for the query on the table of transactions, based at least in part on retrieving and projecting records of the journal of transactions in accordance with the query, the results of the query indicative of the changes applied to the at least one document of the first table.

15. The non-transitory computer-readable storage medium of claim 14, wherein the executable instructions further comprise executable instructions that, as a result of being executed by the one or more processors, cause the computer system to parse the query on the table of transactions based at least in part on a schema of the table of transactions that is derived from schema of the first table.

16. The non-transitory computer-readable storage medium of claim 14, wherein projecting the records of the journal of transactions comprises mapping from data of the records to schema elements of the table of transactions.

17. The non-transitory computer-readable storage medium of claim 14, wherein the query on the table of transactions comprises structured query language expressions.

18. The non-transitory computer-readable storage medium of claim 14, wherein the results of the query are indicative of a history of changes to the at least one document.

19. The non-transitory computer-readable storage medium of claim 14, wherein the executable instructions further comprise executable instructions that, as a result of being executed by the one or more processors, cause the computer system to initiate a scan of fragments of the journal stored on a plurality of computing nodes.

20. The non-transitory computer-readable storage medium of claim 14, wherein the at least one document has been deleted from the table and the results of the query on the table of transactions comprises a row indicative of the deletion of the at least one document from the table.

\* \* \* \* \*